(12) United States Patent  (10) Patent No.: US 7,941,553 B2
Baumeister et al.  (45) Date of Patent: May 10, 2011

(54) METHOD AND DEVICE FOR STREAMING A MEDIA FILE OVER A DISTRIBUTED INFORMATION SYSTEM

(75) Inventors: Sascha Baumeister, Stuttgart (DE); Bernhard Schmid, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 2588 days.

(21) Appl. No.: 10/624,353

(22) Filed: Jul. 22, 2003

(65) Prior Publication Data

US 2004/0078470 A1  Apr. 22, 2004

(30) Foreign Application Priority Data

Oct. 18, 2002  (EP) .................................... 02102466

(51) Int. Cl.
*G06F 15/16* (2006.01)
(52) U.S. Cl. ...................................................... 709/231
(58) Field of Classification Search .................. 709/217, 709/230, 231, 245, 250; 725/86, 87, 91, 725/98
See application file for complete search history.

(56) References Cited

U.S. PATENT DOCUMENTS

| | | | |
|---|---|---|---|
| 6,640,244 B1 * | 10/2003 | Bowman-Amuah | 709/207 |
| 2001/0034786 A1 | 10/2001 | Baumeister et al. | |
| 2002/0124113 A1 | 9/2002 | Gargya et al. | |
| 2003/0115258 A1 | 6/2003 | Baumeister et al. | |
| 2003/0236912 A1 * | 12/2003 | Klemets et al. | 709/236 |

FOREIGN PATENT DOCUMENTS

WO   WO 02/084976 A1   10/2002

OTHER PUBLICATIONS

Vetro, Anthony; Sun, Huifang; Wan, Yao. "Object-Based Transcoding for Adaptable Video Content Delivery." IEEE Transactions on Circuits and Systems for Video Technology, vol. 11, No. 3. Mar. 2001.*
Schulzrinne and Lanphier. "Real Time Streaming Protocol (RTSP)." RFC 2326. Apr. 1998.*
Larry Bouthillier, "Delivering Streaming Media; Managing Dynamic Content for a Changing Web", New Architect, Dec. 1999 (http://www.webtechniques.com/archives/1999/12/bouthillier/).

* cited by examiner

*Primary Examiner* — William C Vaughn, Jr.
*Assistant Examiner* — Scott Christensen
(74) *Attorney, Agent, or Firm* — Matthew J. Bussan

(57) ABSTRACT

A method, device, and program product are provided for streaming a media file over a distributed information system to a client computer running a browser application. First, a server receives a request for a particular media file from the client computer. Then, the server dynamically generates a metafile, whereby said metafile contains information about the identification, location and format of the media file, and returns it back to the client computer. Advantageously, the server intercepts a download request for the actual media file and reinterprets the download request in into a request for receiving a corresponding metafile. Thus, instead of returning the requested media file, a metafile is returned that allows immediate streaming of the requested media file without the need of waiting for the download to be finished.

15 Claims, 1 Drawing Sheet

METHOD AND DEVICE FOR STREAMING A MEDIA FILE OVER A DISTRIBUTED INFORMATION SYSTEM

FIELD OF THE INVENTION

The present invention generally relates to transfer of digital information. Particularly, the present invention relates to a method, computer program product and a device for streaming a media file over a distributed information system, such as the Internet, to a client computer running a browser application.

BACKGROUND OF THE INVENTION

Rich media data extends traditional computer data formats into more natural data formats for the interaction of humans and computers by incorporating images, motion pictures, voice, audio, and video. The distribution of rich media data creates some new issues, namely the need for transferring a huge amount of data. In order to handle this, the streaming of video and generally of media has been established in recent years.

Streaming video is a sequence of "moving images" that are sent in compressed form over the Internet and displayed by a viewer as they arrive. Streaming audio is a sequence of compressed sound segments for the same use. Streaming media comprises streaming video with streaming audio. With streaming video or streaming media, a Web user does not have to wait to download a large file before seeing the video or hearing the sound. Instead, the media is sent in a continuous stream and is played as it arrives. The user needs a player, which is a special program that uncompresses and sends video data to the display and audio data to speakers. A player can be either an integral part of a browser or downloaded from the software maker's Web site.

Major streaming video and streaming media technologies include RealSystem™ G2 from RealNetworks, Microsoft Windows® Media Technologies, IBM Video charger/Video charger player and Apple QuickTime. The standard MPEG (Moving Picture Experts Group) compression algorithm may be used for video. Other approaches use proprietary algorithms. Present technology offers streaming audio at up to 96 Kbps and streaming video at up to 8 Mbps. However, for most Web users, the streaming video will be limited to the data rates of the connection; e.g., up to 128 Kbps with an ISDN connection.

Streaming video is usually sent from pre-recorded video files, but can be distributed as part of a live broadcast "feed." In a live broadcast, the video signal is converted into a compressed digital signal and transmitted from a special Web server that is able to do multicast; i.e., sending the same file to multiple users at the same time.

In today's electronic business environment, standard HTML (Hypertext Markup Language) browsers, i.e., programs allowing a person to read hypertext, are the most popular way to access information and applications in distributed information systems, such as the Internet. These browsers communicate to servers utilizing standard protocols like http (Hypertext Transfer Protocol) and ftp (File Transfer Protocol), whereby a server is a computer that provides some service for other computers connected to it via a network. The most common example is a file server that has a local disk and services requests from remote clients to read and write files on that disk.

The browser's behavior is limited by the capabilities provided by a respective communication protocol; e.g., the ftp protocol is optimized to tasks related to file upload and download, whereas the http protocol is designed to handle more complex requirements, such as files that can contain references to other files whose selection will elicit additional transfer requests.

Within an http communication between the browser and a web server, MIME-Type (Multipurpose Internet Mail Extensions), which is being part of the http reply, allows the browser to determinate the type of data it is currently receiving from the server.

Once the browser determines the type of data it is receiving, it is then capable of doing more complicated tasks such as starting external applications and passing the received information to those applications. Nevertheless, the browser's capabilities are limited to the features provided by the supported protocols, such as the http protocol and the ftp protocol. Some protocols used for streaming, like RTSP (Real Time Streaming Protocol), have to fulfill other requirements, which are not available in a default web browser.

Two kinds of streaming have been established over time: HTTP Streaming transports media data over HTTP but is very limited when it comes to operations like forwarding or rewinding a stream. Therefore, it is mostly used with live feeds and low quality feeds. In opposition to this, "regular" streaming utilizes a special streaming protocol like RTSP which solves such protocol related restrictions. However, the latter requires the introduction of so called streaming metadata in order to enable browsers to start a web application that initiates the streaming. In general such metadata represents a link to rich media data content being hosted on a streaming server. This metadata is passed to a player, which is able to connect to the streaming server and request the rich media data stream for rendering.

The combination of player, streaming server and the format of the metadata used by the player to connect to a stream are usually kept proprietary by their manufacturers. In order to enable streaming of rich media files through different streaming servers and therefore to different players, proprietary metadata for each player/server pair needs to be provided. In an environment in which millions of different rich media files are held for streaming, the effort required for maintenance of the metadata files and web pages is enormous. The effort becomes even more onerous if environment changes like the movement and/or replacement of stream server software becomes necessary.

In general, all web servers read http formatted requests from their network interface, process the request according to the rules defined by the http protocol and generate replies that conform to the http protocol definition. More powerful web servers also support active pages like Java Servlets and CGIs (Common Gateway Interface). Java Servlets and CGIs are files containing executable code that are processed by the web server itself. Java Servlets and CGIs are identified by their path and/or their file extension. Parameters passed to the active page have to be attached to the page's URL (e.g., http://www.ibm.com/cgi-bin/service.pl?location=germany).

In "Managing Dynamic Content for a Changing Web", December 1999, (http://www.newarchitectmag.com/archives/1999/12/bouthillier/), Larry Bouthillier suggests a method for delivering streaming media (hereinafter referred to as the Bouthillier reference). According to his proposal, a video player URL (Uniform Resource Locator) called "play.jsp" is provided and offers users the ability to play any video file or segment and specify start and end times, if desired. According to one embodiment, a hypothetical news organization's Webmaster could provide users with a link to a specific portion of the nightly newscast using a URL (e.g., http://www.ourtvnews.com/play.jsp?segment=dec01_1999_sports3).

This URL accepts the segment, and start or end parameters provided in the URL QUERY_STRING and retrieves the data object for that segment. If start and end times are specified in the QUERY_STRING, play.jsp will play the requested portion of the media file, overriding the start and end time information in the database. Next, it selects a server at random from a server list, and finally, assembles a metafile that will direct a media player, such as RealPlayer™, to launch and connect to the server to play this video. The program sets the MIME-Type in the HTTP result (for example "audio/x-pn-realaudio") to tell the browser which video player to launch. By changing the MIME-Type, it can be determined, for example, whether RealPlayer is launched as a separate application or embedded in the Web page. Finally, the metafile is printed to the output stream, sending it through the Web server to the client, where RealPlayer™ loads it, subsequently analyzes it and plays the selected video by connecting to a streaming server. According to this approach, access is achieved to respective videos and load balancing among the servers. The videos must reside in a database to be accessible via the Web. Simply adding records to the database creates new playable video segments.

SUMMARY OF THE INVENTION

In accordance with the present invention, a method and a device are provided for streaming a media file over a distributed information system to a client computer running a browser application. First, a server receives a request for a particular media file from the client computer. Then, the server provides a metafile; e.g., by dynamically generating the metafile or, alternatively, statically querying the metafile from a respective data storage, whereby said metafile contains information about the identification, location and format of the media file, and returns it back to the client computer. Advantageously, the server intercepts a download request for the actual media file and reinterprets the download request into a request for receiving a corresponding metafile. Thus, instead of returning the requested media file, a metafile is returned that allows immediate streaming of the requested media file without the need of waiting for the download to be finished.

Thus, according to the present invention, metadata required for streaming a particular media file is dynamically created depending, for example, on the file extension of the requested rich media file, the URL or any other portion thereof. Advantageously, only the media file and not one or more metadata files need to be referenced in the web page. Furthermore, the necessity to store and maintain metadata files on the web server is removed. The subject matter of the present invention also allows changing the software environment; e.g., the version or type of a streaming product or the location of media files, the load of the servers, the load of the network, the location of the client, the agreed quality of service with a minimum of effort or allows load balancing with minimum overhead. It advantageously allows the inclusion of large multimedia backend systems by redirecting related web requests. By usage of the method and system according to the present invention, these changes do not affect the setup of the web pages; i.e., the code specifying the layout and content of existing web pages does not need to be changed.

In contrast to the approach previously described in the Bouthillier reference, the present invention allows static or active web pages to reference the media files directly instead of referencing an active page that is parameterised to target the media file. This means there is no longer any indication within static or active web pages whether streaming technology is utilized. This advantageously allows standard web publishing software to support referential integrity between web pages and media files even in case streaming technology is utilized.

The idea of the invention is to target standard HTTP requests for rich media files towards a component that is hereinafter referred to as "Opaque Streaming Meta Data Server" instead of a standard web server. For all HTTP requests fulfilling predefined filter criteria, the Opaque Streaming Meta Data Server returns an appropriate MIME-Type and streaming metadata instead of the original media content. Filter criteria are being built from a list of media format file extensions that can be predefined or configurable.

Additionally, the Opaque Streaming Meta Data Server may be configured to return metadata for several different pairs of player/streaming server products. The Meta Data Generator's configuration determines all default assignments between a rich media file format and the appropriate stream server to use. In order to enable a default override, an optional parameter identifying the preferred Player may be appended to the requested URL (e.g., http://www.ibm.com/rich media/sample.mpg?player=VideoChargerPlayer).

The Opaque Streaming Meta Data Server can be realized in one of two major ways. In the first way, the streaming metadata may be generated on-the-fly. In this case a component called "Meta Data Generator" as described by Larry Bouthillier reference is utilized internally to generate the metadata to be returned on-the-fly. The Opaque Streaming Meta Data Server may be realized as a custom HTTP Server, or as an off-the-shelf web server that redirects all requests matching the filter criteria mentioned above to this Meta Data Generator, passing the URL of the file originally requested along as a parameter.

In the second way, the streaming metadata may be queried from a data store. In this case, a component called "Meta Data Query" is used internally to query the metadata to be returned from a pre-filled data store. Again, the Opaque Streaming Meta Data Server can be realized as a standalone application or as a web server that redirects all requests matching the filter criteria mentioned above to this Meta Data Query, passing the URL of the file originally requested along as a parameter.

BRIEF DESCRIPTION OF THE DRAWINGS

The present invention is illustrated by way of example and is not limited by the shape of the FIGURES of the drawings in which.

DETAILED DESCRIPTION OF THE INVENTION

Figure 1:
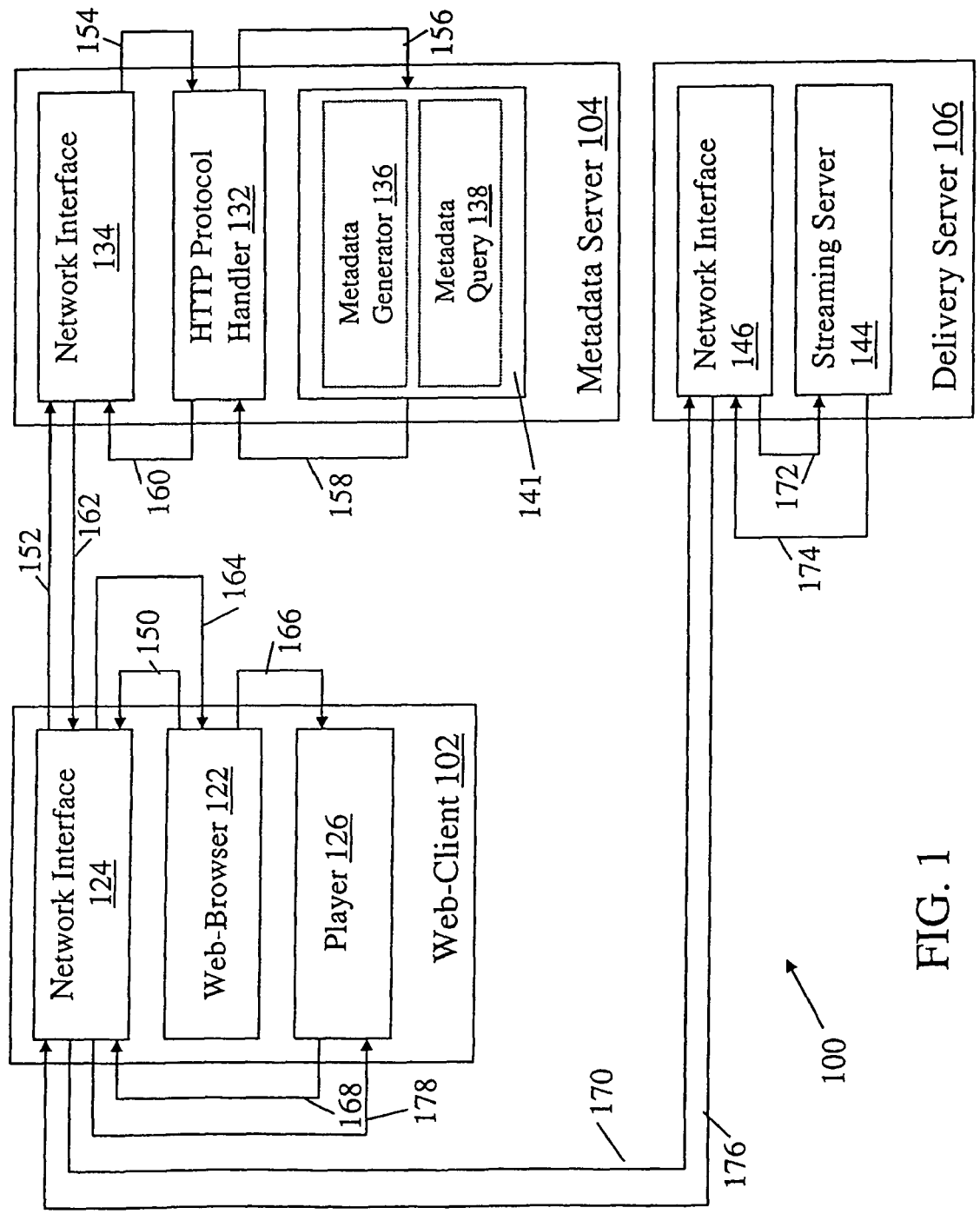
FIG. 1 is a block diagram illustrating a system in which the subject matter of the present invention may be used, and a device in accordance with the present invention.

With reference now to FIG. 1, there is depicted a block diagram illustrating a system 100 in which the subject matter of the present invention may be used and a device in accordance with the present invention.

The system 100 includes a web client 102, a metadata server 104 and a delivery server 106 mutually connected by a network (not shown). The web client 102 may be formed by a computer system, such as a personal computer, a laptop computer or a PDA (personal digital assistant), running an operating system, like MS Windows by Microsoft Corporation, Palm OS by Palm Inc. or GNU/Linux. It comprises a web browser 122, a network interface 124 and multimedia player 126. Microsoft's Internet Explorer or the Netscape Navigator may form the web browser. An Ethernet Adapter running a TCP/IP stack may typically implement the network interface 124, whereas Real Network's RealPlayer or Microsoft's Media Player may form the multimedia player 126.

The metadata server 104 may be implemented in software and be based on a computer system, such as a personal computer, a laptop computer or a server computer. The computer system may be driven by an operating system like MS Windows or Linux. It includes an HTTP protocol handler 132 and a network interface 134. Additionally, it features either a metadata generator component 136 or a metadata query component 138 or both as illustrated by two dotted-line rectangles inside a solid line block 141. An Ethernet Adapter running a TCP/IP stack may typically implement the network interface 134.

The HTTP protocol handler 132 reinterprets HTTP requests for media content in a way that it returns streaming metadata content instead. The metadata generator component 136 generates streaming metadata on the fly, whereas the metadata query component 138 queries pre-made metadata from an internal data store (not shown).

The delivery server 106 may be realized as a program running on a server computer. It takes care of streaming media content to the web client 102. It is acknowledged that in a production environment one metadata server and one delivery server may communicate to a plurality of web clients. Furthermore, one metadata server may cooperate with multiple delivery servers; e.g., in order to perform load balancing, or vice versa, it may even be advantageous that multiple metadata server cooperate with a plurality of delivery servers in order to serve a number of web clients.

A streaming server 144 and network interface 146 is included in the delivery server 106. A RealServer by Real Networks or Windows Media Services by Microsoft Corporation may form the streaming server 144. Typical network interfaces are for example Ethernet adapters running a TCP/IP stack.

The diagram according to FIG. 1 also illustrates the request flow that takes place when requesting to stream media content:

The web browser 122 composes an HTTP request for a particular media content file and sends it to the web client's network interface 124 (arrow 150). A user clicking an HTML document link may initiate this action. Alternatively a user may initiate this action by typing the request URL into the browsers URL input field. Please note that the request URL points to the media file itself, and neither to a streaming metafile nor a CGI/Java Servlet program component.

The network interface 124 subsequently forwards the request to the counterpart network interface 134 on the metadata server 104 addressed in the HTTP request URL (arrow 152).

In response, the network interface 134 forwards the request to the HTTP protocol handler 132 that is registered to handle HTTP requests and to provide an appropriate response (arrow 154).

Usually, a HTTP protocol handler would answer an HTTP request either by returning the content of the resource requested (default HTTP behavior), or by executing the resource and forwarding it's reply (Java Servlets, CGI scripts). However, the HTTP protocol handler 132 according to the present invention reinterprets the HTTP request so that it returns streaming metadata instead. In order to do so, the HTTP protocol handler 132 requests metadata for the requested media resource either from the metadata generator 136 or from the metadata query component 138 (arrow 156), depending on the way the metadata server 104 is configured to generate/query streaming metadata for one or more known delivery servers 106.

The HTTP protocol handler may be realized as a standalone program or by utilizing a standard web server component like Apache that is fitted with a suitably configured URL redirector plug-in feature for forwarding the requests to the metadata generator 136 or metadata query component 138.

In case the metadata generator 136 was contacted, it generates streaming metadata on the fly based on known streaming server types and the type of the requested media resource; i.e., media file. In case the metadata query component 138 was contacted, it queries existing metadata from an internal data store that associates media locations with pre-made streaming metadata. In both cases the resulting streaming metadata is returned to the HTTP protocol handler 132 (arrow 158). A MIME-Type suitable for the streaming metadata that is either also generated/queried or specified as configuration information is accompanying the returned streaming metadata.

The metadata generator 136 and metadata query component 138 may be realized as Java Servlets running in a J2EE (Java 2 Platform, Enterprise Edition) container like Tomcat (a Servlet container that is used in the official Reference Implementation for the Java Servlet and JavaServer Pages technologies) or CGI scripts.

The HTTP protocol handler 132 builds a HTTP response that contains the streaming metadata and the MI-type mentioned above. Then, it returns the HTTP response to the network interface 134 (arrow 160).

Subsequently, the network interface 134 transfers the HTTP response to the network interface 124 on the web client 102 that initiated the request in the first place (arrow 162). Then, the network interface returns the HTTP response to the requesting web browser 122 (arrow 164).

The web browser 122 analyzes the MIME-type contained in the HTTP response and selects a suitable multimedia player 126 based on this information. It starts the multimedia player 126 and forwards the received streaming metadata information to it (arrow 166).

In return, the multimedia player 126 analyses the streaming metadata passed to it and extracts all relevant information, such as which streaming server to contact, which streaming protocol to use, which file to stream. Streaming protocols may be RTSP, HTTP or proprietary protocols depending on the streaming technology provider. Then, the multimedia player 126 composes a streaming protocol request and sends it to the network interface 124 (arrow 168).

The network interface 124 sends the streaming protocol request to its counterpart on the delivery server 106, namely, the network interface 146 (arrow 170).

The network interface 146 on the delivery server 106 forwards the streaming protocol request to the streaming server 144 (arrow 172). Then, the streaming server 144 analyses the streaming protocol request, checks the availability and accessibility of the media file requested. In case the checks are not passed, it returns a streaming protocol response that indicates the media file cannot be streamed. In case the checks are passed, it returns a positive streaming protocol reply. Additionally, it starts sending data packets to the corresponding networks interface 146, usually using a real-time protocol like UDP (arrow 174).

The networks interface 146 of the delivery server 106 transfers the real-time protocol packets to the counterpart network interface 124 of the web client 102 (arrow 176). Subsequently, the network interface 124 of the web client 102 forwards real-time protocol packets to the multimedia player 126 (arrow 178).

The multimedia player 126 receives the real-time packets and renders their content as they arrive. Packets that don't arrive in order are not rendered in order to preserve the timeline of the multimedia content.

In a preferred embodiment the present invention may be combined with additional Technology.

The present invention may be combined with the subject matter of the pending U.S. patent application Ser. No. 09/803,513, by Baumeister et al., filed Mar. 9, 2001, "Method And System For streaming Media Data In Heterogeneous Environments." There is disclosed a new method and system for streaming media data in a heterogeneous network environment. Additionally to existing standard streaming products; e.g. standard Media Player and Stream Server, a Stream Server Portal, which controls a set of Stream Servers is provided. The Stream Server Portal offers a service called prepareStreaming to applications, which return the streaming metadata necessary to initiate streaming for given media instances. The use of the Stream Server Portal allows generating streaming metadata necessary to initiate streaming on the fly as part of executing a prepareStreaming request. This completely removes the need to store and maintain said streaming metadata and solves the problems associated with it. Furthermore, Stream Server Portal allows transferring media data to a stream server machine transparently as part of executing a prepareStreaming request. This removes the constraint of media data to be maintained on the same machine as the stream server software and solves the problems this creates for certain server platforms. The Stream Server Portal can minimize the additional network traffic by maintaining a cache of the media data already transferred. Finally, Stream Server Portal allows choosing among available stream servers (even from different makers) in order to stream a particular media as part of executing a prepareStreaming request. This removes the need for companies to decide for a proprietary stream server software, as the Stream Server Portal shields the application requiring streaming from knowing the specifics about, and from storing and maintaining streaming meta data.

The combination adds media distribution capabilities to the Opaque Streaming Metadata Generator. The idea is to replace the metadata generator 136/metadata query 138 components with the Media Request Broker described that selects a suitable stream server for each client request on the fly. The idea is that instead of generating/querying streaming metadata for delivery servers that are statically associated to media files, such a system is capable of dynamically selecting a suitable delivery server and return suitable metadata. In order to achieve this, such a system caches the media files on the delivery servers and utilizes additional information for selection besides media format and streaming server type, like delivery server utilization and proximity between delivery server and Web Client.

Additionally, the present invention may be combined with the subject matter of the pending International Patent Application, Appl. No. WO/EP02/02947, by Gerd Breiter et al., filed Mar. 16, 2002, "Method and Computer System for Selecting an Edge Server Computer." According to this, a computer system is provided comprising client, having a Web browser with a media player, a web application server, a content server, edge servers ES1 to ES4 and a media request broker. After the client has selected a media for streaming the media request broker makes a determination concerning an appropriate edge server to perform the streaming operation. This determination is made based on an extension of the client's http request made by the edge server and passed from the application server to the media request broker.

The combination of an Opaque Streaming Metadata Generator with both subject matters significantly improves the quality of distribution decisions made by the system by providing client locality information of a fine granularity to the stream server selection process described above. The client locality information is transparently added to the HTTP request (arrow 152 of FIG. 1) while the request passes a proxy server equipped with the technology described in the International Patent Application.

Instead or in addition the present invention may be combined with the subject matter of the pending U.S. patent application Ser. No. 10/017,951, by Baumeister et al., filed Dec. 13, 2001, "Time Zone Difference Based Locality Estimation Between Web Clients and E-Business Servers." There is described a system and a method for optimizing network routing using the network topology. The method includes a user sending a request for information to a server. The server receives the request and sends to the user the requested information in addition to a client side program. The client program then reads and saves the local user time. The user then sends another request for information to the server. In this request is embedded the local user time saved by the client side program. A server side program residing on server then receives the request and the local user time. The server side program uses the local server time to determine the topological location of the user and the identity of the server that is best suited to handle the request by the user. Finally, the server forwards the request of the user to the identified server.

Compared to the aforementioned copending patent applications, the latter one delivers less granular client locality information but has the advantage of not requiring additional infrastructure.

Additionally, the present invention may be combined with the subject matter of the pending U.S. patent application Ser. No. 10/087,723, by Peter Fischer et al., filed Sep. 5, 2002, "A Method And A Bridge For Coupling A Server And A Client of Different Object Types." According to this improvement the computer system has clients and servers of different object models, such as SOAP (Simple Object Access Protocol), CORBA (Common Object Request Broker Architecture) and/or EJB (Enterprise JavaBeans). In order to connect a SOAP client to a CORBA or EJB server a bridge is used containing corresponding server and client components as well as a mapping component in order to map object and method requests of one type into another. This way distributed application services can be provided.

A combination minimizes latency times caused by synchronously transferring media content into stream server caches during client requests.

The invention above is usable on every server system that supports Web technology. The major advantage is the simplification of embedding streamable media into Web applications. A change of the streaming environment is achievable by changing the configuration of the technology described above instead of requiring adoptions of existing HTML pages. The need of creating, maintaining und understanding metadata is removed.

Primary utilizers of the technology described are service providers (xSPs) seeking independence from specific streaming server technology providers, corporate intranet departments with the same desire, and providers of rich media related technology such as Content Management systems, Enterprise Media Beans, etc.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for streaming a media file over a distributed information system to a client computer running a browser application, the method comprising the steps of:
    receiving a request for a particular media file from a client computer,
    providing a metafile, wherein said metafile contains information about the identification, location and format of the media file,
    returning said metafile back to said client computer,
characterized in that
    the step of receiving a request for a particular media file from a client computer comprises the steps of:
    intercepting a download request for the actual media file and
    reinterpreting said download request into a request for receiving a corresponding metafile.

2. The method according to claim 1, wherein the step of reinterpreting said download request includes the step of deriving information about said corresponding metafile from a portion of the URL.

3. The method according to claim 2, wherein said portion of the URL is the file extension of the requested media file.

4. The method according to claim 1, wherein the step of providing a metafile comprises one of the steps of:
    dynamically generating a metafile, and
    statically querying a metafile from a data store.

5. The method according to claim 1, wherein the step of reinterpreting said download request includes the step of:
    checking predefined filter criteria determining of whether or not a metafile is to be returned instead of the requested media file.

6. The method according to claim 1, wherein the step of providing a metafile further includes the step of retrieving information about the configuration of at least one item chosen from the group comprising: version of the streaming product, type of the streaming product, location of the media file, load of the servers, load of the network, location of the client, quality of service.

7. The method according to claim 1, wherein the step of providing a metafile further includes the step of reading information about the client's preferred streaming format and forming a metafile in accordance with the client's preference.

8. A computer-readable program stored on a non-transitory computer-readable medium, said computer readable program being configured to perform the steps of:
    receiving a request for a particular media file from a client computer,
    providing a metafile, wherein said metafile contains information about the identification, location and format of the media file,
    returning said metafile back to said client computer,
characterized in that
    the step of receiving a request for a particular media file from a client computer comprises the steps of:
    intercepting a download request for the actual media file and
    reinterpreting said download request into a request for receiving a corresponding metafile.

9. The computer-readable program of claim 8, wherein the step of reinterpreting said download request includes the step of deriving information about said corresponding metafile from any portion of the URL.

10. The computer-readable program of claim 9, wherein said portion of the URL is the file extension of the requested media file.

11. The computer-readable program of claim 8, wherein the step of providing a metafile comprises one of the steps of:
    dynamically generating a metafile, and
    statically querying a metafile from a data store.

12. The computer-readable program of claim 8, wherein the step of reinterpreting said download request includes the step of:
    checking predefined filter criteria determining of whether or not a metafile is to be returned instead of the requested media file.

13. The computer readable program of claim 8, wherein the step of providing a metafile further includes the step of retrieving information about the configuration of at least one item chosen from the group comprising: version of the streaming product, type of the streaming product, location of the media file, load of the servers, load of the network, location of the client, quality of service.

14. The computer readable program of claim 8, wherein the step of providing a metafile further includes the step of reading information about the client's preferred streaming format and forming a metafile in accordance with the client's preference.

15. A method for streaming a media file over a distributed information system to a client computer running a browser application, the method comprising the steps of:
    receiving, at a metadata server, a request for a particular media file from a client computer,
    providing, at said metadata server, a metafile and a MIME-type, wherein said metafile contains information about the identification, location and format of the media file,
    returning said metafile and said MIME-type back from said metadata server to said client computer,
    starting a media player on said client computer based on said MIME-type, wherein said media player is started by a browser application running on said client computer,
    forwarding said metafile from said browser application to said media player,
    extracting information from said metafile, wherein the extracted information is extracted from said metafile by said media player and includes information identifying a streaming server to contact and a streaming protocol to use,
    composing a streaming protocol request based on said extracted information,
    forwarding said streaming protocol request from said client computer to said streaming server identified in said extracted information, sending a streaming protocol reply and data packets from said streaming server to said client computer in response to receiving said streaming protocol request,
characterized in that
the step of receiving a request for a particular media file from a client computer comprises the steps of:

intercepting a download request for the actual media file and
reinterpreting said download request as a request for receiving a corresponding metafile.

* * * * *